United States Patent
Yamane

(10) Patent No.: US 7,768,334 B2
(45) Date of Patent: Aug. 3, 2010

(54) SEMICONDUCTOR INTEGRATED CIRCUIT

(75) Inventor: Fumiyuki Yamane, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/264,406

(22) Filed: Nov. 4, 2008

(65) Prior Publication Data

US 2009/0140788 A1 Jun. 4, 2009

(30) Foreign Application Priority Data

Dec. 4, 2007 (JP) ............................... 2007-313441

(51) Int. Cl.
*G06F 1/04* (2006.01)
(52) U.S. Cl. ........................ 327/297; 327/564
(58) Field of Classification Search ........................ None
See application file for complete search history.

(56) References Cited

U.S. PATENT DOCUMENTS

| | | | | | |
|---|---|---|---|---|---|
| 5,261,153 A | * | 11/1993 | Lucas | ............................ | 29/830 |
| 6,069,812 A | * | 5/2000 | Lee et al. | ........................ | 365/51 |
| 6,114,877 A | * | 9/2000 | Brown et al. | ................... | 326/96 |
| 6,810,515 B2 | * | 10/2004 | Lu et al. | ......................... | 716/18 |
| 7,051,310 B2 | * | 5/2006 | Tsao et al. | ...................... | 716/10 |
| 7,120,571 B2 | * | 10/2006 | Shei et al. | ...................... | 703/23 |
| 7,257,788 B2 | * | 8/2007 | Haar et al. | ....................... | 716/6 |
| 7,511,548 B2 | * | 3/2009 | Bueti et al. | ................... | 327/295 |
| 7,581,131 B1 | * | 8/2009 | Prasad et al. | ................. | 713/401 |
| 2003/0037271 A1 | * | 2/2003 | Liu et al. | ...................... | 713/322 |
| 2007/0016884 A1 | * | 1/2007 | Nishimaru | .................... | 716/13 |

FOREIGN PATENT DOCUMENTS

JP 2002-93913 3/2002

\* cited by examiner

*Primary Examiner*—Cassandra Cox
(74) *Attorney, Agent, or Firm*—Oblon, Spivak, McClelland, Maier & Neustadt, L.L.P.

(57) ABSTRACT

A semiconductor integrated circuit has a plurality of clock tree cells arranged in a tree structure on clock signal lines transmitting a clock signal, the plurality of clock tree cells forming a clock tree. The clock tree cells include first power supply lines connected to the clock tree cells, second power supply lines connected to logic circuits receiving a clock signal supplied from the clock tree, and a plurality of power supply pads connected to the first power supply lines and the second power supply lines.

18 Claims, 5 Drawing Sheets

Enlarged "A"

SEMICONDUCTOR INTEGRATED CIRCUIT

CROSS-REFERENCE TO RELATED APPLICATIONS

This application is based upon and claims the benefit of priority from the prior Japanese Patent Application No. 2007-313441, filed on Dec. 4, 2007, the entire contents of which are incorporated herein by reference.

BACKGROUND OF THE INVENTION

1. Field of the Invention

The present invention relates to a semiconductor integrated circuit, and in particular, to a semiconductor integrated circuit including a so-called clock tree.

2. Description of the Related Art

Logic circuits in semiconductor integrated circuits may have errors in their logic functionality due to the variations in delay time of clock signal. Thus, in order to provide uniformity in delay time of clock signal provided to circuits, clock tree cells are arranged on clock signal lines in a tree structure (hereinafter referred to as a "clock tree"), thereby accomplishing a uniform wiring (see Patent Document 1: Japanese Patent Laid-Open No. HEI 11-194848). However, while this method enables the variations in delay time to be reduced, some problems arise that the clock tree cells are sensitive to the voltage drop caused by the power consumption at other logic circuits, affecting the cycle of a clock signal to be driven (i.e., providing a larger clock skew). As development in current semiconductor integrated circuits is directed to further refinement, there also arise needs of corresponding increase in the frequency of clock signals, decrease in the power supply voltages, and increase in the size of circuit. These issues may exacerbate the problems described above.

SUMMARY OF THE INVENTION

One aspect of the present invention provides a semiconductor integrated circuit comprising: a plurality of clock tree cells arranged in a tree structure on clock signal lines transmitting a clock signal, the plurality of clock tree cells forming a clock tree; first power supply lines connected to the clock tree cells; second power supply lines connected to logic circuits receiving a clock signal supplied from the clock tree; and a plurality of power supply pads connected to the first power supply lines and the second power supply lines.

DETAILED DESCRIPTION OF THE EMBODIMENTS

Embodiments of a semiconductor integrated circuit according to the present invention will now be described below based on the accompanying drawings.

First Embodiment

Figure 1:
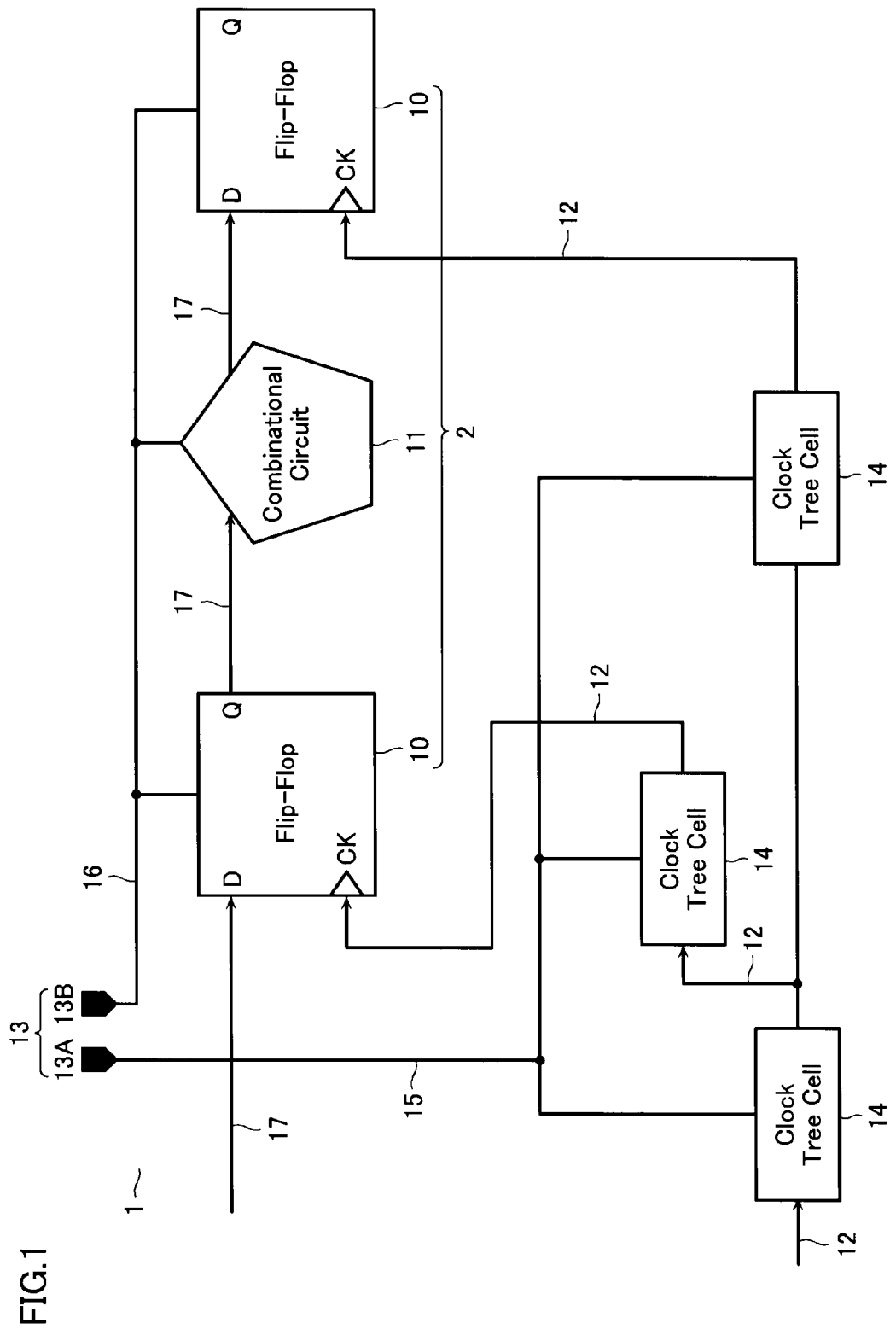
FIG. 1 is a block diagram illustrating a general configuration of a semiconductor integrated circuit 1 according to a first embodiment of the present invention.

FIG. 1 is a block diagram illustrating a general configuration of a semiconductor integrated circuit 1 according to a first embodiment of the present invention.

As illustrated in FIG. 1, the semiconductor integrated circuit 1 according to the first embodiment includes logic circuits 2 such as flip-flop circuits 10 or a combinational circuit 11, clock signal lines 12, a power supply pad 13, clock tree cells 14, a power supply line for clock tree 15, a power supply line for logic circuit 16, etc.

The logic circuits 2 plays a role of processing data transferred from data lines 17. The logic circuits 2 are provided with clock signals from the clock signal lines 12. The clock signal lines 12 are disposed in a tree structure, on which a plurality of clock tree cells 14 are arranged. The clock tree cells 14 may be used for establishing a clock tree, and may include buffers, inverters, clock gating circuits, or the like. Note that while the actual semiconductor integrated circuit 1 has a large number (hundreds to tens of thousands) of flip-flop circuits 10, only two flip-flop circuits 10 are illustrated in FIG. 1 for simplicity. In addition, while the actual clock tree cells 14 have several tens of stages, FIG. 1 illustrates a two-stage tree formed by three clock tree cells 14. Of course, the present invention is not intended to be limited to the example of FIG. 1.

As illustrated in FIG. 1, this embodiment involves separate power supply lines: power supply lines for clock tree 15 connected to the clock tree cells 14 and power supply lines for logic circuit 16 connected to the logic circuits 2. It also involves separate power supply pads as the power supply pad 13: a power supply pad for clock tree 13A connected to the power supply lines for clock tree 15 and a power supply pad for logic circuit 13B connected to the power supply lines for logic circuit 16.

This enables a clock signal with a small clock skew to be supplied to the logic circuits 2 since the clock tree cells 14 are not affected by the voltage drop caused by the power consumption at the logic circuits 2.

Figure 2A:
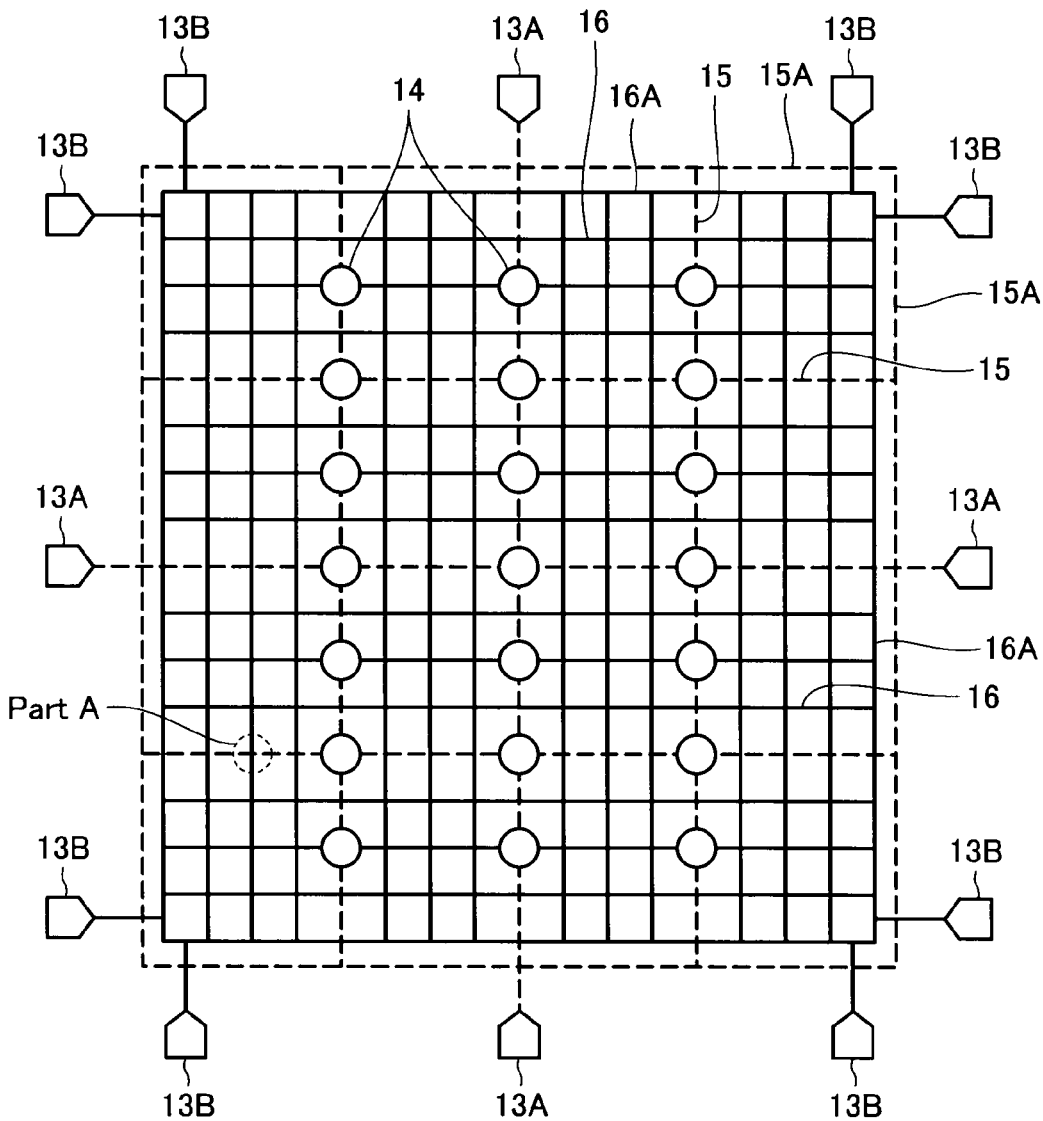
FIG. 2A is a wiring layout diagram of the power supply lines for clock tree and the power supply lines for logic circuit in the semiconductor integrated circuit according to the first embodiment of the present invention.

FIG. 2A illustrates a wiring layout of the power supply lines for clock tree 15, the power supply lines for logic circuit 16, the power supply pads for clock tree 13A, and the power supply pads for logic circuit 13B according to the first embodiment.

The semiconductor integrated circuit 1 according to the first embodiment comprises the power supply lines for clock tree 15 that are formed in a grid pattern on the same layer on a semiconductor substrate (not illustrated), the power supply lines for logic circuit 16 that are also formed in a grid pattern thereon, and power supply pads 13A and 13B to which the power supply lines 15 and 16 are connected.

As illustrated in FIG. 2A, the power supply lines 15 and 16 are formed to connect the edges of the respective grids. Those portions connecting the edges (hereinafter referred to as the "circumferences") in a closed-loop manner represent power supply lines 15A and 16A.

The power supply pads 13A and 13B are formed outside the circumference 15A of the power supply lines for clock tree 15 and the circumference 16A of the power supply lines for logic circuit 16, respectively.

Figure 2B:
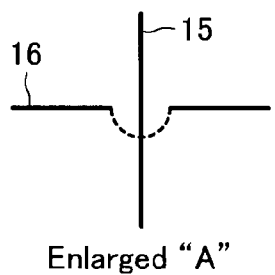
FIG. 2B is an enlarged view of "A" part of FIG. 2A.

One of each power supply line for clock tree 15 and each power supply line for logic circuit 16 is bypassed to another layer at each intersection between the power supply lines 15 and 16 to prevent the power supply lines 15 and 16 from electrical contact with one another. FIG. 2B illustrates an example of bypassing a power supply line 16.

In conventional semiconductor integrated circuits, one type of power supply lines are formed in a grid pattern on the same layer and used for supplying power to both the clock tree cells and the logic circuits. In this case, in view of the above-mentioned problems, in this embodiment, one type of power supply lines on the same layer is divided into two types in a grid pattern: the power supply lines 15 and 16, as described above. In other words, one part of the conventional power supply lines commonly used for both the clock tree cells and the logic circuits is replaced with the power supply lines for clock tree 15 to which only the clock tree cells 14 can be connected, and the residual part is replaced with the power supply lines for logic circuit 16 to which the logic circuits 2 can be connected.

The clock tree cells 14 of this embodiment are only arranged immediately below the power supply lines for clock tree 15 that are formed in a grid pattern, and hence supplied with power supply voltage only from the power supply lines for clock tree 15. That is, the clock tree cells 14 is not supplied with power supply voltage from the power supply lines for logic circuit 16. On the other hand, the logic circuits 2 are only connected to the power supply lines for logic circuit 16.

The power supply lines for clock tree 15 are connected to the power supply pads for clock tree 13A, while the power supply lines for logic circuit 16 are connected to the power supply pads for logic circuit 13B. This provides complete electrical isolation between the clock tree cells 14 and the logic circuits 2.

In the first embodiment, all of the clock tree cells 14 are connected to the power supply lines for clock tree 15 and the power supply pads 13A are also provided for the power supply lines for clock tree 15. This may, therefore, enable the clock tree cells 14 to be free from any effects of the voltage drop caused by the power consumption at the logic circuits 2.

Second Embodiment

A semiconductor integrated circuit 1 according to a second embodiment of the present invention will now be described below based on the accompanying drawings. The entire configuration of the semiconductor integrated circuit 1 according to this embodiment is the same as the first embodiment (FIG. 1). However, this embodiment is different from the first embodiment in how the power supply lines 15 and 16 are used. This is explained with reference to FIG. 3.

Figure 3:
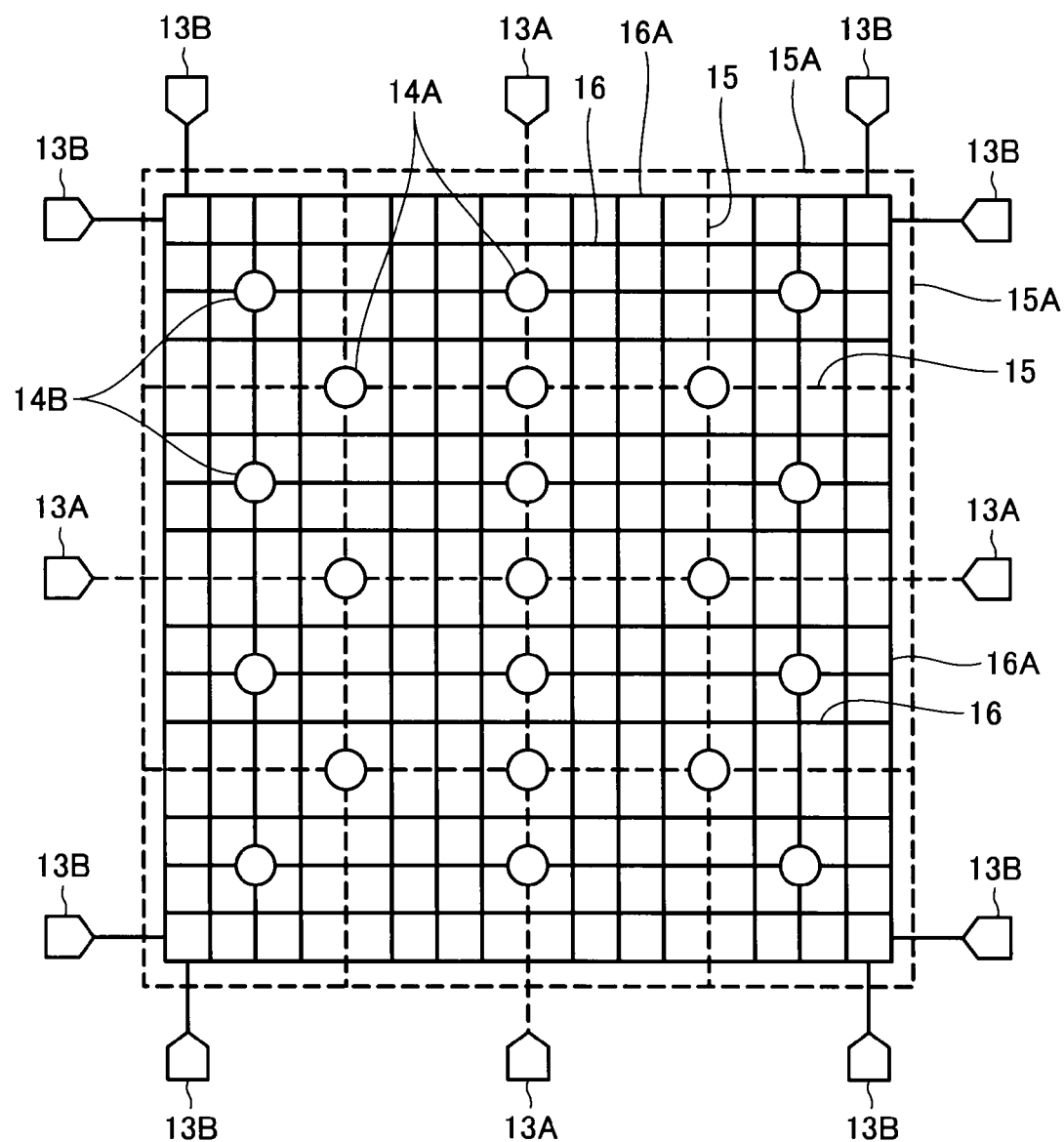
FIG. 3 is a wiring layout diagram of power supply lines for clock tree and power supply lines for logic circuit in a semiconductor integrated circuit according to a second embodiment of the present invention.

FIG. 3 illustrates a wiring layout of power supply lines for clock tree 15, power supply lines for logic circuit 16, the power supply pads for clock tree 13A, and the power supply pads for logic circuit 13B according to the second embodiment. The semiconductor integrated circuit 1 according to the second embodiment comprises the power supply lines for clock tree 15 that are formed in a grid pattern on the same layer on a semiconductor substrate (not illustrated), the power supply lines for logic circuit 16 that are also formed in a grid pattern thereon, and power supply pads 13A and 13B to which the power supply lines 15 and 16 are connected.

As illustrated in FIG. 3, the power supply lines 15 and 16 are formed to connect the edges of the respective grids and their circumferences represent power supply lines 15A and 16A.

The power supply pads 13A and 13B are formed outside the circumference 15A of the power supply lines for clock tree 15 and the circumference 16A of the power supply lines for logic circuit 16, respectively.

One of each power supply line for clock tree 15 and each power supply line for logic circuit 16 is bypassed to another layer at each intersection between the power supply lines 15 and 16. The above-mentioned points are the same as those described in the first embodiment.

However, in the second embodiment, some parts (14A) of the clock tree cells 14 are connected to the power supply lines for clock tree 15, while the residuals (14B) are connected to the power supply lines for logic circuit 16 that are also used for supplying power to the logic circuits 2.

Note that the power supply lines for clock tree 15 are connected to the power supply pads for clock tree 13A and the power supply lines for logic circuit 16 are connected to the power supply pads for logic circuit 13B. This is the same as the first embodiment.

This means that, in the second embodiment, some parts 14A of the clock tree cells are completely isolated from the logic circuits 2, while the residuals 14B share a common power source with the logic circuits 2. Thus, it is expected in this embodiment that a clock signal involves a larger clock skew than in the first embodiment due to the existence of the clock tree cells 14A connected the power supply lines for clock tree 15 and the clock tree cells 14B connected to the power supply lines for logic circuit 16.

However, in some cases, it is more desirable to connect those clock tree cells 14 to the power supply lines for logic circuit 16. Specifically, if a clock tree cell is arranged at a downstream position where many other clock tree cells are arranged in its upstream, while few clock tree cells are arranged in its downstream (i.e., it is at a top branch of the clock tree), it is more desirable to connect the clock tree cell 14 to the power supply lines for logic circuit 16. This can be explained by the following two reasons.

Firstly, even if clock tree cells 14 arranged at top branches are connected to the power supply lines for logic circuit 16, fewer clock tree cells 14 are affected by a clock skew caused therein.

Secondly, the power supply lines for clock tree 15 may have large length, thereby increasing a floating inductance or a floating capacitance therein that may cause a clock skew.

In addition, this embodiment allows certain clock tree cells to be selectively connected to power supply lines 15 or 16. In other words, it provides the certain clock tree cells with flexibility in arrangement. This allows clock tree cells to be arranged at positions where they are less affected by the clock skew.

In summary, in the second embodiment, some parts (14A) of the clock tree cells connected to the power supply lines for clock tree 15 have a power supply provided separately from the logic circuits 2. Accordingly, in the clock tree cells 14, since only those clock tree cells 14B connected to the power supply lines for logic circuit 16 are affected by the voltage drop caused by the power consumption at the logic circuits 2, the number of clock tree cells 14 that are isolated from the logic circuits 2 becomes smaller than the first embodiment. However, selectively connecting the clock tree cells 14 to the power supply lines 15 or 16 may reduce the effects of arrangement of the clock tree cells and clock skews caused by floating capacity and inductance than the first embodiment. Therefore, it is possible to reduce the impact on the clock tree cells 14 due to the voltage drop caused by the power consumption at the logic circuits 2, in comparison with a conventional configuration where separate power supplies are not used.

Third Embodiment

A semiconductor integrated circuit 1 according to a third embodiment of the present invention will now be described below based on the accompanying drawings. The entire configuration of the semiconductor integrated circuit 1 according to this embodiment is the same as the first embodiment (FIG. 1). However, this embodiment is different from the first embodiment in how the power supply pads 13 are used. This is explained with reference to FIG. 4.

Figure 4:
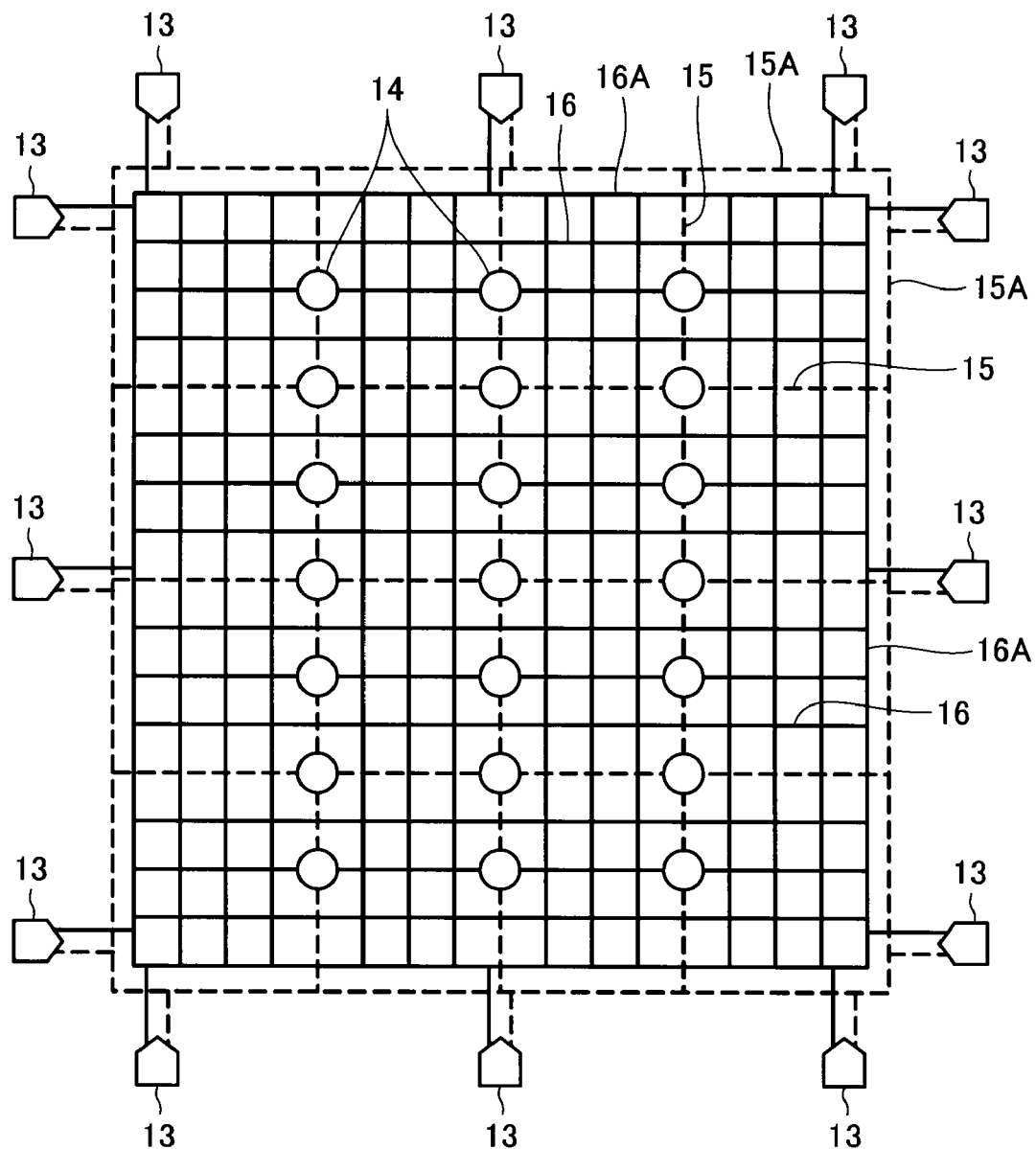
FIG. 4 is a wiring layout diagram of power supply lines for clock tree and power supply lines for logic circuit in a semiconductor integrated circuit according to a third embodiment of the present invention.

FIG. 4 illustrates a wiring layout of power supply lines for clock tree 15, power supply lines for logic circuit 16, and the power supply pads 13 according to the third embodiment.

The semiconductor integrated circuit 1 according to the third embodiment comprises the power supply lines for clock tree 15 that are formed in a grid pattern on the same layer on a semiconductor substrate (not illustrated), the power supply lines for logic circuit 16 that are also formed in a grid pattern thereon, and power supply pads 13 to which the power supply lines 15 and 16 are connected.

As illustrated in FIG. 4, the power supply lines 15 and 16 are formed to connect the edges of the respective grids and their circumferences represent power supply lines 15A and 16A.

The power supply pads 13 are formed outside the circumference 15A of the power supply lines for clock tree 15 and the circumference 16A of the power supply lines for logic circuit 16, respectively. One of each power supply line for clock tree 15 and each power supply line for logic circuit 16 is bypassed to another layer at each intersection between the power supply lines 15 and 16. The above-mentioned points are the same as those described in the first embodiment.

However, in the third embodiment, the power supply lines for clock tree 15 and the power supply lines for logic circuit 16 are connected to a common power supply pad 13.

Note that the clock tree cells 14 are connected to the power supply lines for clock tree 15 and the logic circuits 2 are connected to the power supply lines for logic circuit 16. This is the same as the first embodiment.

This means that, in the third embodiment, the clock tree cells 14 are not completely isolated from the logic circuits 2 and connected to the common power supply pad 13. Thus, it is expected that the clock tree cells 14 be affected more than the first embodiment by the voltage drop caused by the power consumption at the logic circuits 2.

However, the power supply pads 13 are less affected by the voltage drop caused by the power consumption at the logic circuits 2 since they are connected to an external power supply (not illustrated). That is, the power supply pads 13 still have stable voltage when connected to the power supply lines for logic circuit 16. Consequently, even if the power supply lines 15 and 16 are connected to a common power supply pad 13, there would be little impact on the clock tree cells 14 by the voltage drop caused by the power consumption at the logic circuits 2.

In addition, connecting the power supply lines 15 and 16 to a common power supply pad 13 increases the number of the power supply pads 13 that are connected to the power supply lines 15 and 16 than the first and second embodiments. As can be seen from the above, the power supply pads 13 have stable voltage and hence such advantages can be obtained that the more power supply pads 13 connected to the power supply lines 15 and 16, the more clock tree cells 14 supplied with stable voltage.

In summary, in the third embodiment, the clock tree cells 14 are not completely isolated from the logic circuits 2 since the power supply lines 15 and 16 are connected to a common power supply pad 13, while all of the clock tree cells 14 are connected to the power supply lines for clock tree 15. However, even if the power supply lines 15 and 16 are connected to a common power supply pad, there would be little impact on the clock tree cells 14 by the voltage drop caused by the power consumption at the logic circuits 2. In addition, it is possible to supply stable voltage to more clock tree cells 14 by increasing the number of the power supply pads 13 connected to the power supply lines 15 and 16.

Therefore, it is possible to reduce the impact on the clock tree cells 14 due to the voltage drop caused by the power consumption at the logic circuits 2, in comparison with a conventional configuration where separate power supplies are not used.

Fourth Embodiment

A semiconductor integrated circuit 1 according to a fourth embodiment of the present invention will now be described below based on the accompanying drawings. The entire configuration of the semiconductor integrated circuit 1 according to this embodiment is the same as the first embodiment (FIG. 1). However, this embodiment is different from the first embodiment in how the power supply pads 13 as well as the power supply lines 15 and 16 are used. This is explained with reference to FIG. 5.

Figure 5:
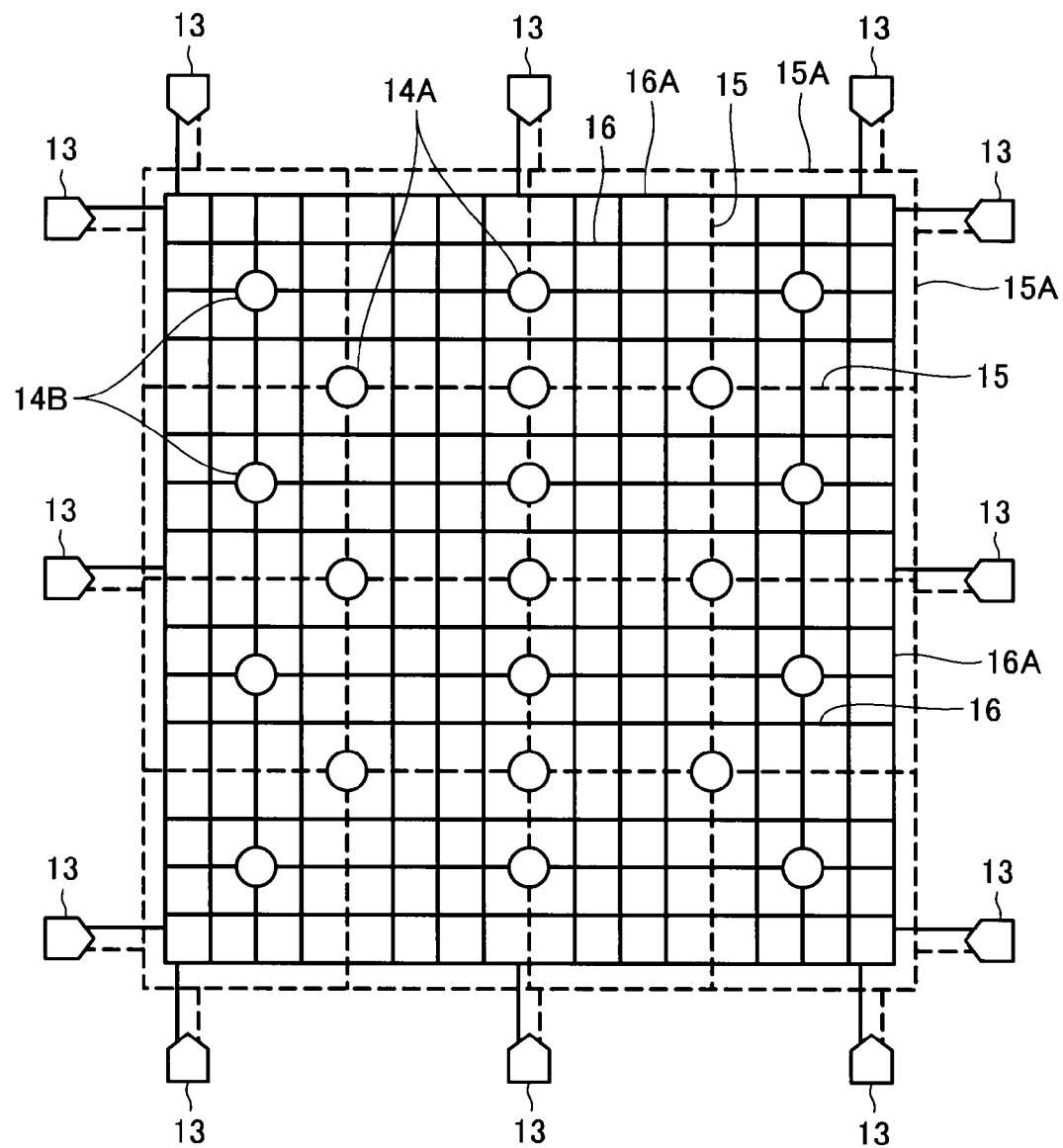
FIG. 5 is a wiring layout diagram of power supply lines for clock tree and power supply lines for logic circuit in a semiconductor integrated circuit according to a fourth embodiment of the present invention.

FIG. 5 illustrates a wiring layout of power supply lines for clock tree 15, power supply lines for logic circuit 16, and the power supply pads 13 according to the fourth embodiment.

The semiconductor integrated circuit 1 according to the fourth embodiment comprises the power supply lines for clock tree 15 that are formed in a grid pattern on the same layer on a semiconductor substrate (not illustrated), the power supply lines for logic circuit 16 that are also formed in a grid pattern thereon, and power supply pads 13 to which the power supply lines 15 and 16 are connected.

As illustrated in FIG. 5, the power supply lines 15 and 16 are formed to connect the edges of the respective grids and their circumferences represent power supply lines 15A and 16A.

The power supply pads 13 are formed outside the circumference 15A of the power supply lines for clock tree 15 and the circumference 16A of the power supply lines for logic circuit 16, respectively. One of each power supply line for clock tree 15 and each power supply line for logic circuit 16 is bypassed to another layer at each intersection between the power supply lines 15 and 16. The above-mentioned points are the same as those described in the first embodiment.

However, in fourth embodiment, some parts (14A) of the clock tree cells 14 are connected to the power supply lines for clock tree 15, while the residuals (14B) are connected to the power supply lines for logic circuit 16 that are also used for supplying power to the logic circuits 2. Further, the power supply lines for clock tree 15 and the power supply lines for logic circuit 16 are connected to a common power supply pad 13.

This means that, in the fourth embodiment, some parts 14A of the clock tree cells are completely isolated from the logic circuits 2, while the residuals 14B share a common power source with the logic circuits 2. Further, those clock tree cells 14 connected to the power supply lines for clock tree 15 are also not completely isolated from the logic circuits 2 since the power supply lines 15 and 16 are connected to a common power supply pad 13.

Thus, this embodiment is different from the first embodiment in that some parts (14B) of the clock tree cells are connected to the power supply lines for logic circuit 16 and the power supply lines 15 and 16 are connected to a common power supply pad 13.

However, it may reduce the effects of arrangement of the clock tree cells and clock skews caused by floating capacity and inductance than the first embodiment by selectively connecting the clock tree cells 14 to the power supply lines 15 or 16. In addition, it is possible to supply stable voltage to more clock tree cells 14 by increasing the number of the power supply pads 13 connected to the power supply lines 15 and 16. Therefore, it is possible to reduce the impact on the clock tree cells 14 due to the voltage drop caused by the power consumption at the logic circuits 2, in comparison with a conventional configuration where separate power supplies are not used.

Other Embodiment

While embodiments of the present invention have been described, the present invention is not intended to be limited to the disclosed embodiments and various other changes, additions or the like may be made thereto without departing from the spirit of the invention. For example, while in the above embodiments the circumference 15A of the power supply lines for clock tree 15 is formed outside the circumference 16A of the power supply lines for logic circuit 16, the present invention is not limited to the disclosed embodiments and the circumference 16A of the power supply lines for logic circuit 16 may be formed outside the circumference 15A of the power supply lines for clock tree 15.

What is claimed is:

1. A semiconductor integrated circuit comprising:
   a plurality of clock tree cells arranged in a tree structure on clock signal lines transmitting a clock signal, the plurality of clock tree cells forming a clock tree;
   first power supply lines connected to the clock tree cells;
   second power supply lines connected to logic circuits receiving a clock signal supplied from the clock tree; and
   a plurality of power supply pads connected to the first power supply lines and the second power supply lines,
   wherein
   the first power supply lines and the second power supply lines comprise:
      a plurality of first lines disposed in a grid pattern; and
      a second line disposed in a closed-loop manner to connect edges of the plurality of first lines.

2. The semiconductor integrated circuit according to claim 1, wherein
   the first power supply lines are connected to a part of the clock tree cells.

3. The semiconductor integrated circuit according to claim 1, wherein
   the plurality of power supply pads comprise:
      first power supply pads connected to the first power supply lines; and
      second power supply pads connected to the second power supply lines.

4. The semiconductor integrated circuit according to claim 1, wherein
   the first power supply lines and the second power supply lines are formed on the same layer.

5. The semiconductor integrated circuit according to claim 4, wherein
   at each intersection between the first power supply lines and the second power supply lines,
   one of the first power supply lines and the second power supply lines has a bypassed portion formed on another layer.

6. The semiconductor integrated circuit according to claim 1, wherein
   the second power supply lines are connected to the logic circuits as well as to a part of the clock tree cells.

7. The semiconductor integrated circuit according to claim 1, wherein
   the first power supply lines and the second power supply lines are connected to a common one of the power supply pads.

8. The semiconductor integrated circuit according to claim 1, wherein
   the plurality of power supply pads are formed outside the second line.

9. The semiconductor integrated circuit according to claim 1, wherein
   the logic circuits comprise flip-flop circuits and a combinational circuit.

10. The semiconductor integrated circuit according to claim 1, wherein
    the power supply pads are connected to an external power supply.

11. A semiconductor integrated circuit comprising:
    a plurality of clock tree cells arranged in a tree structure on clock signal lines transmitting a clock signal, the plurality of clock tree cells forming a clock tree;
    first power supply lines connected to the clock tree cells; and
    second power supply lines connected to logic circuits receiving a clock signal supplied from the clock tree,
    the first power supply lines being connected to a part of the clock tree cells,
    wherein
    the first power supply lines and the second power supply lines comprise:
       a plurality of first lines disposed in a grid pattern; and
       a second line disposed in a closed-loop manner to connect edges of the plurality of first lines.

12. The semiconductor integrated circuit according to claim 11, wherein
    the first power supply lines and the second power supply lines are formed on the same layer.

13. The semiconductor integrated circuit according to claim 12, wherein
    at each intersection between the first power supply lines and the second power supply lines,
    one of the first power supply lines and the second power supply lines has a bypassed portion formed on another layer.

14. The semiconductor integrated circuit according to claim 11, wherein
    the second power supply lines are connected to the logic circuits as well as to a part of the clock tree cells.

15. The semiconductor integrated circuit according to claim 11, wherein
    the first power supply lines and the second power supply lines are connected to a common one of power supply pads.

16. The semiconductor integrated circuit according to claim 11, wherein the logic circuits comprise flip-flop circuits and a combinational circuit.

17. A semiconductor integrated circuit comprising:

a plurality of clock tree cells arranged in a tree structure on clock signal lines transmitting a clock signal, the plurality of clock tree cells forming a clock tree;

first power supply lines connected to the clock tree cells; and second power supply lines connected to logic circuits receiving a clock signal supplied from the clock tree, the first power supply lines and the second power supply lines further comprise:

a plurality of first lines disposed in a grid pattern; and a second line disposed in a closed-loop manner to connect edges of the plurality of first lines.

18. The semiconductor integrated circuit according to claim 17, further comprising a plurality of power supply pads connected to an outside of the second line.

* * * * *